United States Defensive Publication [19] (H) [11] T958,005

Cash, Jr. [43] May 3, 1977

[54] THERMOSETTING CELLULOSE ESTER POWDER COATING COMPOSITIONS

[76] Inventor: George O. Cash, Jr., 2220 Hermitage Drive, Kingsport, Tenn. 37664

[21] Appl. No.: 732,278

[22] Filed: Oct. 14, 1976

Related U.S. Application Data

[63] Continuation of Ser. No. 610,344, Sept. 4, 1975, abandoned.

[51] Int. Cl.[2] ..... C08L 1/14

[52] U.S. Cl. ..... 260/15

[57] ABSTRACT

A thermosetting powder coating composition comprises a low molecular weight cellulose acetate butyrate as the major component, an aminoplast crosslinking agent, an epoxide-blocked organic sulfonic acid catalyst, an epoxy resin and a plasticizer.

No Claims, No Sheets Drawing,

14 Pages Specification

The file of this unexamined application may be inspected and copies thereof may be purchased (849 O.G. 1221, Apr. 9, 1968).